United States Patent [19]

Prochnow

[11] 4,032,986

[45] June 28, 1977

[54] SCANNING DEVICE FOR THE RECORDING AND/OR PLAY-BACK OF WIDE-BAND SIGNALS

[75] Inventor: Rudolf Prochnow, Darmstadt-Eberstadt, Germany

[73] Assignee: Robert Bosch Fernsehanlagen G.m.b.H., Darmstadt, Germany

[22] Filed: Mar. 22, 1976

[21] Appl. No.: 669,346

[30] Foreign Application Priority Data

Mar. 26, 1975 Germany .......................... 2513326

[52] U.S. Cl. ............................................. 360/130
[51] Int. Cl.² ........................................ G11B 15/60
[58] Field of Search ...................... 360/130, 84, 85

[56] References Cited

UNITED STATES PATENTS

| 3,679,840 | 7/1972 | Maxey | 360/130 |
| 3,955,215 | 5/1976 | Hosoi | 360/130 |

*Primary Examiner*—Robert S. Tupper
*Attorney, Agent, or Firm*—Ernest F. Marmorek

[57] ABSTRACT

The invention relates to a scanning device for recording and/or play-back of wide-band signals from a magnetic tape by the diagonal track method. Such devices include a stationary hollow guide drum having two parts spaced apart to define a slot with the drum being adapted to receive a magnetic tape engaging less than 360° of the periphery thereof and a head-wheel carrying at least two magnetic heads and disposed in the drum for the rotation of the magnetic heads transversally to the slot for scanning the magnetic tape which is moved diagonally across the slot. The improvement includes a guide drum holder having two parts and operable for retaining the parts of the guide drum in a predetermined alignment, first connecting means operable to connect rigidly each part of the holder means to respective parts of the guide drum, and second connecting means operable to connect detachably the parts of the holder means to each other, whereby the holder can be disconnected and then connected and the parts of the guide drum will be substantially in the predetermined alignment.

4 Claims, 2 Drawing Figures

SCANNING DEVICE FOR THE RECORDING AND/OR PLAY-BACK OF WIDE-BAND SIGNALS

CROSS-REFERENCE TO RELATED APPLICATIONS

Reference is had to the patent applications to Peter Gunschmann, Ser. No. 604,626, filed Aug. 14, 1975 and Heinrich Zahn, Ser. No. 663,080, filed on Mar. 2, 1976, both having the same assignee as the instant patent application.

BACKGROUND OF THE INVENTION

The invention relates to a scanning device for recording and/or play-back of wide-band signals from a magnetic tape by the diagonal track method, including a stationary hollow guide drum having two parts spaced apart to define a slot around which a magnetic tape is wound helically at an angle of less than 360° and a head-wheel carrying at least two magnetic heads is disposed in the drum for rotation of the magnetic heads transversely to the slot for scanning the magnetic tape which is moved diagonally across the slot.

Generally, devices for the recording of sound on magnetic tape utilize a relatively narrow magnetic tape which is guided along one or more stationary magnetic heads. In contrast, magnetic tape recording devices for high frequencies and wide-band signals such as television signals utilize a relatively wide slowly moving magnetic tape which is scanned by one or more magnetic tapes at an angle with respect to the direction of motion of the magnetic tape. Accordingly, the recorded information is retained in the magnetic tape as a series of parallel, finite track segments which extend from one edge of the magnetic tape to the opposite edge at some angle with respect to the edges.

Another known device includes a magnetic tape which moves around a cylinder jacket and is swept by a head wheel in a transversal direction to the direction of motion. Prior art systems include a device in which the magnetic tape is wound helically around a cylindrical guide drum and is scanned in diagonal tracks by a head wheel which revolves in a slot defined by two parts of the drum. The angle of the magnetic tape around the guide drum can lie between 90° and 360° and accordingly, the angular position of the individual, closely adjacent, track segments with respect to the central axis of the magnetic tape can be different. In addition to other requirements, the location and angular position of the track segments must be equivalent for all devices within very close tolerances in order to maintain a good quality of reproduction. This is particularly important for the recording and play-back of television signals.

To achieve a high degree of accuracy, the assemblage of the scanning device must be precise. The assembly of the two parts of the guide drum and the tape guide elements which determine the position of the magnetic tape on the guide drum present the greatest difficulties. The reason for this is that the two parts of the guide drum must individually be accurately dimensioned and their relative position with respect to each other must be precise with regard to the relative displacement and the relative angular positions. Otherwise, the magnetic tape will undergo a change in its geometric shape when passing from one drum section to the other and thereby cause errors in the quality of the operation.

As a result of the high scanning rate and the direct tape-head contact during the recording and play-back of television signals, the magnetic heads in the device undergo considerable wear and require replacement after a few hundred hours of operation. For this reason, it is desirable to have the head wheel arranged for simple replacement after the separation of the parts of the guide drum. In addition, the assembly of the scanning device should be simple and maintain the original precision with respect to positioning.

From the German patent DT-OS 1,930,779, a scanning device of the type mentioned above is known and the method of assembly is also known. That device includes a drum arrangement having two parts with a rotating head wheel arranged therein. The guide drum includes two extremely precise flat surfaces which engage the cylindrical external surface of two parts of the drum arrangement connected with them after an adjustment of the separation of the two parts has been made.

It would be preferable to have a scanning device which permits the head wheel to be replaced by a simple disconnection of the guide drum parts and the simple re-assembly of the guide drum parts without any substantial loss of accuracy.

SUMMARY OF THE INVENTION

One of the principal objects of the invention is a scanning device for recording and/or play-back of wide-band signals from a magnetic tape by the diagonal track method, including a stationary hollow guide drum having two parts spaced apart to define a slot, the drum adapted to receive a magnetic tape engaging less than 360° of the periphery thereof, and a head-wheel having at least two magnetic heads and disposed in the drum for rotation of the magnetic heads transversally to the slot for scanning the magnetic tape which is moved diagonally across the slot, and featuring a guide drum holder means having two parts and operable for retaining the parts of the guide drum in a predetermined alignment, first connecting means operable to connect rigidly each part of the holder means to respective parts of the guide drum, and second connecting means operable to connect detachably the parts of the holder means to each other, whereby the holder means can be disconnected and then connected and the parts of the guide drum will be substantially in the predetermined alignment.

Further objects and advantages of the invention will be set forth in part in the following specification and in part will be obvious therefrom without being specifically referred to, the same being realized and attained as pointed out in the claims hereof.

The invention accordingly comprises the feature of construction, combination of elements and arrangement of parts which will be exemplified in a construction hereinafter set forth and the scope of the application of which will be indicated in the claims.

BRIEF DESCRIPTION OF THE DRAWINGS

For a fuller understanding of the nature and objects of the invention, reference should be had to the following detailed description, taken in connection with the accompanying drawings, in which.

DESCRIPTION OF THE PREFERRED EMBODIMENT

Figure 1:
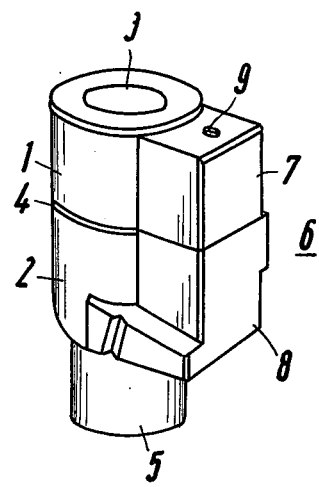
FIG. 1 shows a scanning device according to the instant invention.
Figure 2:
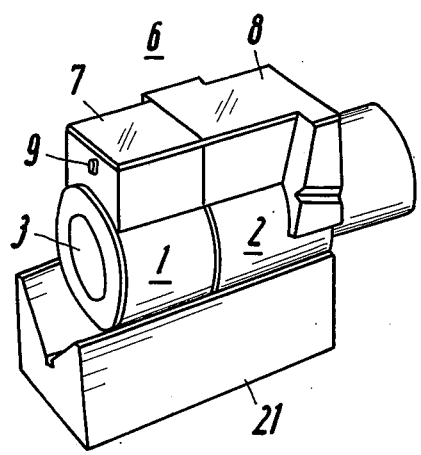
FIG. 2 shows an assembly of the scanning device of FIG. 1.

In carrying the invention into effect, one of the embodiments has been selected for illustration in the accompanying drawing and for description in the specification, reference being had to FIGS. 1 and 2.

Each of the two parts of the tape guide drum 1 and 2 have a central bore 3. Both parts of the guide drum 1 and 2 have the same external diameter within a high degree of accuracy. Between the parts 1 and 2, there is a circular slot 4 defined for the passage of the head wheel (not shown) which carries two or more magnetic heads.

The lower part 2 includes an extension 5 which is concentric with the outer surface for attaching the scanning device within the chassis of a magnetic tape device. The holding means such as the two part connecting piece 6 connects and fixes the relative position of the two parts 1 and 2. The connecting piece 6 has two components 7 and 8 which are detachably connected to each other by screw connection 9 to form a uniform connecting piece 6.

The assembly of the scanning device is in a precision prism 21 as shown in FIG. 2. The two parts 1 and 2 are manufactured to have substantially the same external diameters. The parts 1 and 2 are placed into the prism 21 with a predetermined spacing from each other to define the slot 4. The two components 7 and 8 are precisely manufactured especially with regard to the front sides facing each other and are connected together by the screw connection 9. The side of the connecting piece 6 facing the parts 1 and 2 is machined or otherwise modified to define a hollow cylindrical form without very stringent requirements as to the accuracy. In the center of each hollow cylindrical surface there is defined a recess having a depth of about 0.1 mm. After the components 7 and 8 have been connected to each other, the recess is filled with a highly refractory glue such as an epoxy or the like and placed on top of the parts 1 and 2 which have been arranged in the prism 21. The hardening of the glue takes place preferably at room temperature in order to minimize the occurrence of thermal stresses.

After the glue has hardened, the parts 1 and 2 are connected in a substantially precise unitary structure relatively free of stress. Thereafter, the screw 9 can be used to disconnect the components 7 and 8 so that the head wheel can be mounted within the bore hole 3 along with other equipment usually disposed therein such as an adjustable converter or the like.

The assembly of the parts 1 and 2 in the prism 21 can be made by connecting the components 7 and 8 with the screw 9. The re-assembled scanning device substantially exhibits the same predetermined alignment.

Another advantage is that the desired conformity of the surfaces of the parts 1 and 2 is greatest in the center of the so-called tape-looping-angle. For the diagonal track magnetic tape devices, a half image or a full image is recorded for each track and the instant scanning device results in the least play-back errors because of the high accuracy in the vicinity of the center of the tape-looping-angle.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. In a scanning device for recording and/or playback of wide-band signals from a magnetic tape by the diagonal track method, including a stationary hollow guide drum having two parts spaced apart to define a slot, said drum adapted to receive a magnetic tape engaging less than 360° of the periphery thereof, and a head-wheel carrying at least two magnetic heads and disposed in said drum for the rotation of the magnetic heads transversally to said slot for scanning said magnetic tape which is moved diagonally across said slot, the improvement comprising:

a guide drum holder means having two parts for retaining said two parts of said guide drum in a predetermined alignment;

means fixedly attaching each part of said holer means to a respective part of said guide drum; and connecting means detachably connecting the parts of said holder means to each other; whereby said holder mans can be disconnected and then connected and the parts of said guide drum will be substantially in the predetermined alignment.

2. The scanning device as claimed in claim 1, wherein each part of said drum holder means has a cylindrical bore defined therein.

3. The scanning device as claimed in claim 1, wherein said attaching means is an adhesive which forms a bond at room temperature.

4. The scanning device as claimed in claim 1, wherein the connecting means comprises a screw.

* * * * *